3 Sheets--Sheet 2.
C. EDGAR.
Horse Hay-Rakes.
No. 149,296. Patented April 7, 1874.
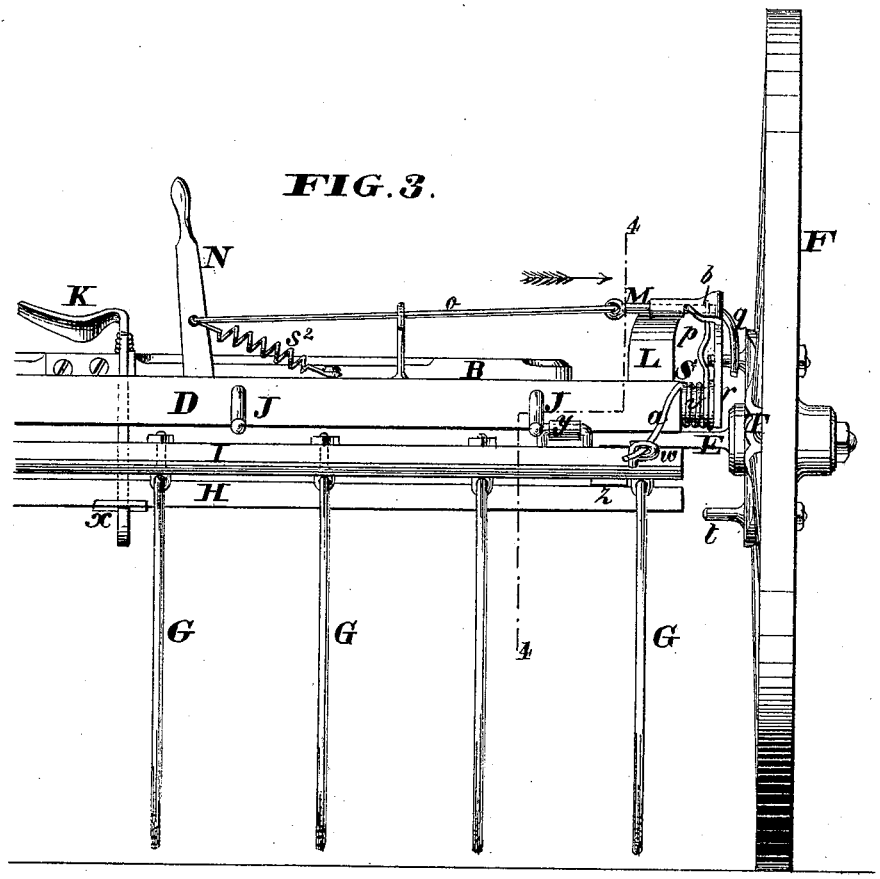
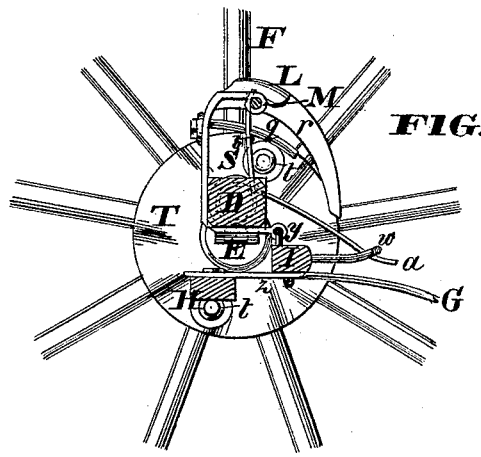
WITNESSES
Jas L. Ewin
Walter Allen
INVENTOR
Charles Edgar
By Knight Bro, Attorneys
AM. PHOTO-LITHOGRAPHIC CO. N.Y. (OSBORNE'S PROCESS.)

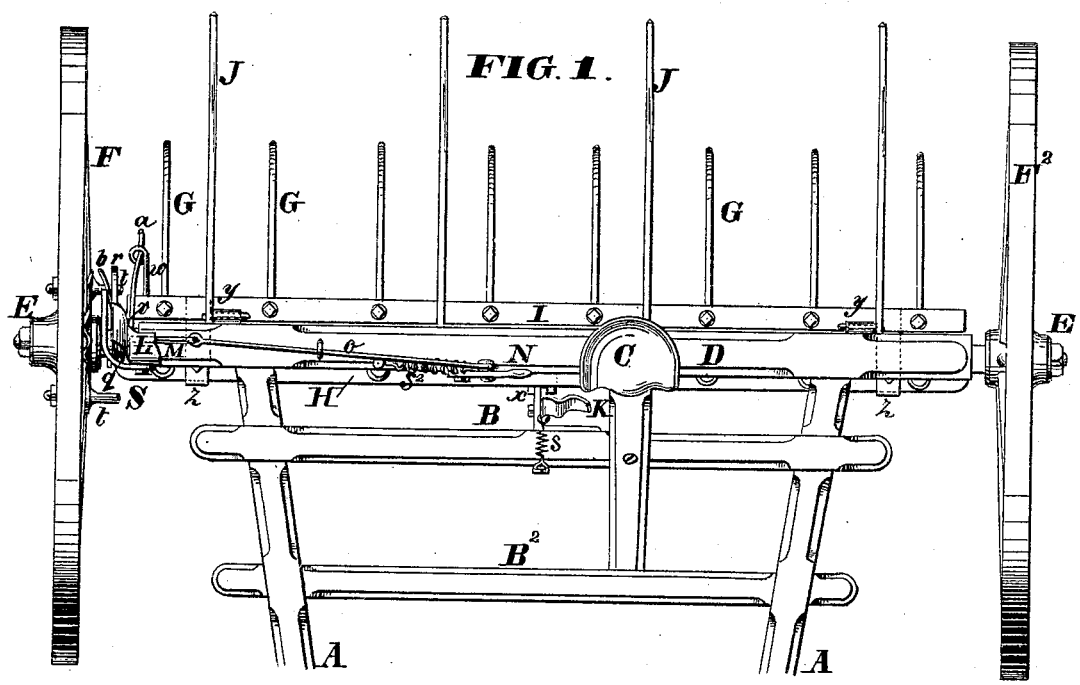
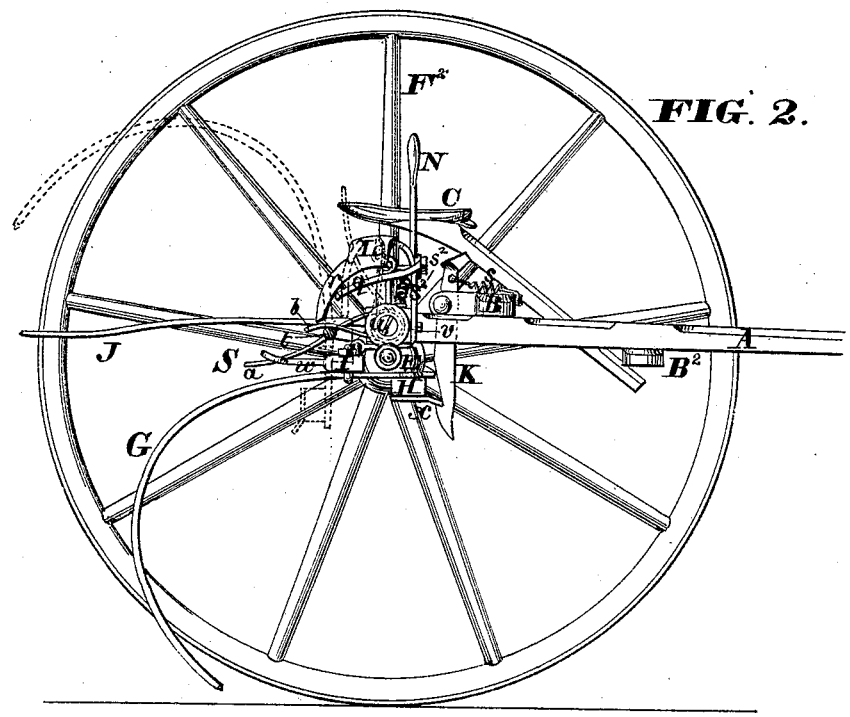

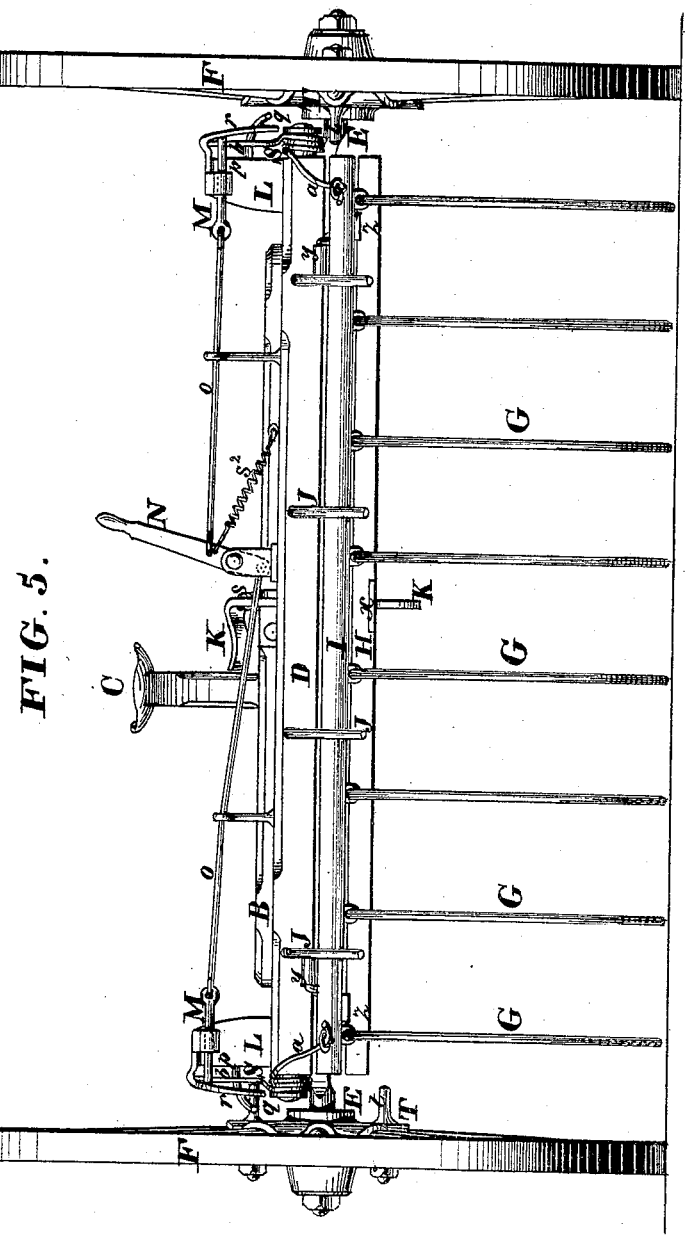

UNITED STATES PATENT OFFICE.

CHARLES EDGAR, OF DAYTON, OHIO.

IMPROVEMENT IN HORSE HAY-RAKES.

Specification forming part of Letters Patent No. 149,296, dated April 7, 1874; application filed February 16, 1874.

*To all whom it may concern:*

Be it known that I, CHARLES EDGAR, of Dayton, in the county of Montgomery and State of Ohio, have invented an Improved Horse Hay-Rake, of which the following is a specification:

The present invention consists primarily in the employment of a spring or springs for elevating the teeth to discharge the accumulated hay at the will of the operator, in combination with an automatic spring-catch for holding the teeth in working position, said spring or springs being wound or set while the teeth are thus held in working position, and operating to instantaneously elevate the teeth when the retaining-catch is tripped.

The invention consists, further, in a mode of winding or setting, applying and disconnecting, such spring or springs, with means for carrying the same into effect, as hereinafter set forth.

Figure 1 is a plan view of a horse hay-rake, illustrating this invention. Fig. 2 is a side elevation of the same on a larger scale, the near wheel being removed. Fig. 3 is a partial rear elevation on a still larger scale. Fig. 4 is a partial vertical section on the line 4 4, Fig. 3. Fig. 5 is a full rear elevation of a horse hay-rake, illustrating the employment of a dumping-spring at each end of the axle.

In the drawing, A A represent thills; B B², cross-bars by which the thills are framed together; C, the seat of the driver or operator; D, a wooden axle-tree to which the thills are rigidly attached; E E, spindles bolted to the under side of the axle-tree; and F F² ground-wheels thereon, which may be of any approved construction. G G represent rake-teeth, and H I cross-bars uniting the same; z z, links uniting the bars H I, and y y hinges applied to the bar I, for attaching the rake-teeth to the axle-tree. J J represent clearing-fingers, projecting from the back of the axle-tree D. For holding the teeth in working position, as shown in full lines in Fig. 2, a catch, K, is pivoted in a bracket applied to the thill-bar B, and a latch-plate, x, is applied to the front bar H of the rake-teeth to engage therewith. A spring, s, of suitable form is applied to this catch to project it, and it is adapted at its upper end to be tripped by the foot of the operator to release the rake-teeth for dumping. The teeth of the rake, shown in Figs. 1 to 4, are actuated to discharge or dump the load by a spring, S, which (in the illustration) consists of a helical coil of strong elastic wire, with its two ends, $a\ b$, normally, in nearly the same horizontal plane, as shown in full lines in Fig. 2, and which is wound or set by separating these ends to a distance of ninety degrees, more or less. This spring is applied by the end $a$ engaging with an eye at the extremity of an arm, $w$, to the rear bar I of the rake-teeth, and it is mounted on cylindrical wrists $v\ v$ formed at the ends of the axle-tree, and each secured thereon by a disk, $u$, attached by a screw. For winding or setting the spring the adjoining ground-wheel F is provided with a pair of pins or projections, $t$, on its inner side, and the winding-end $b$ of the spring projects laterally, so as to lie in the path of these pins in its normal position, as shown in Fig. 1, consequently the spring will be wound or set by the forward rotation of the ground-wheels. To provide for guiding the winding end $b$ of the spring, and for detaching it from the winding-pins, and for retaining it in its wound or set position, a jack, L, is erected at the adjoining end of the axle-tree, and is constructed with a guide bar or apron, $r$, a detaching-cam, $q$, and a recess, $p$, within the apron $r$ to receive the spring end, which is here arrested by a bolt, M, sliding in ways in the jack L. The spring being thus wound or set, as shown in Figs. 3 and 4, the rake-teeth will be instantly elevated thereby at the will of the operator, who has simply to trip the catch K with his foot, thus releasing the rake-teeth for this purpose.

The rake-teeth being thus elevated, as shown in dotted lines in Fig. 2, will be sustained in elevated position by the same means until returned to working position by the operator. The machine is consequently adapted for going to and from the field without special provision.

For returning the rake-teeth to working position at the will of the operator, a hand-lever, N, pivoted to the axle-tree, is connected, by a rod, $o$, to the bolt M, which is held in effective position by a spring, $s^2$, applied to this lever. By a slight movement of the lever N the bolt may be retracted. This releases the spring S, which is carried back to its normal position by the return of the rake-teeth, which are lowered by gravity. The catch-plate $x$, on the front cross-bar H of the rake-teeth, engages at once with the retaining-catch K. The winding end $b$ of the spring is engaged by one of the winding-pins $t$ during the next rotation of the ground-wheel F, and the operation above described is repeated. In either position of the spring the continued rotation of the wheels, either forward or backward, will not affect it.

The winding-pins may be attached to the wheel as in the illustration by annular corrugated metallic disks T applied to the respective faces of the wheel and united by bolts, extensions of which form the pins or projections.

The rake-teeth are, preferably, attached to the under side of their rear bar I by staple-bolts, and to the top of the front bar H by bolts passing through eyes; but these and other details of construction are not essential to the present invention.

The elevating or dumping spring, with its appurtenances, may be duplicated, as illustrated in Fig. 5; or the machine, or the respective parts thereof, may be modified in other mechanical details in carrying the invention into practice.

The only modifications in shape and arrangement incident to the application of dumping-springs to both ends of the axle are as follows: The springs S and the jacks L are "rights and lefts" at the respective ends of the axle. The latch K and hand-lever N are not duplicated, but the latter is extended below its fulcrum, and the additional connecting-rod $o$ is attached to this extension at the same distance below as the first is above the fulcrum. The second rod extends from its point of connection to the second stop-bolt or detent M, and is longer than the first. The position of the fulcrum-bracket of the lever N is, preferably, changed, as represented. Both ground-wheels are winding-wheels, F, and may be identical in construction.

The following is claimed as new, namely:

1. A wheeled horse hay-rake with oscillating teeth, having a spring or springs for elevating the teeth to discharge the accumulated hay at the will of the operator, in combination with an automatic spring-catch for holding the teeth in working position, the said spring or springs being wound or set while the teeth are thus retained, and operating to instantaneously elevate the teeth when the catch is tripped, substantially as herein described.

2. A wheeled horse hay-rake with oscillating teeth, having a spring or springs wound by the forward motion of one or both of the wheels, and which then serves to elevate the teeth at the will of the operator, substantially as herein set forth.

3. A wheeled horse hay-rake with oscillating teeth, having a spring or springs for elevating the teeth to dump the load, in combination with stop-bolts or detents for sustaining the teeth in elevated position, or permitting the same to return to their work by gravity, at the will of the operator, substantially as herein specified.

4. The combination, in a wheeled horse hay-rake, of oscillating teeth having a cross-bar by means of which they are hinged to the axle, and a second cross-bar in front of the former, a dumping spring or springs applied to the rear cross-bar of the teeth, and a catch applied to the front cross-bar for holding the teeth in working position, substantially as herein shown and described.

CHAS. EDGAR.

Witnesses:
OCTAVIUS KNIGHT,
JAS. L. EWIN.